United States Patent
Cai

(10) Patent No.: US 10,021,570 B1
(45) Date of Patent: Jul. 10, 2018

(54) PRIORITIZATION OF MOBILE NETWORKS FOR PROXIMITY SERVICES

(71) Applicant: Nokia Technologies Oy, Espoo (FI)

(72) Inventor: Yigang Cai, Naperville, IL (US)

(73) Assignee: Nokia Technologies OY, Espoo (FI)

( * ) Notice: Subject to any disclaimer, the term of this patent is extended or adjusted under 35 U.S.C. 154(b) by 0 days.

(21) Appl. No.: 15/634,324

(22) Filed: Jun. 27, 2017

(51) Int. Cl.
  *H04W 12/08* (2009.01)
  *H04W 4/02* (2018.01)
  *H04W 12/06* (2009.01)

(52) U.S. Cl.
  CPC ........... *H04W 12/08* (2013.01); *H04W 4/023* (2013.01); *H04W 12/06* (2013.01)

(58) Field of Classification Search
  CPC ..... H04W 48/12; H04W 48/16; H04W 48/18; H04W 48/20; H04W 88/06; H04W 12/02; H04W 12/06; H04W 12/08; H04W 12/12; H04W 88/02; H04L 63/08
  See application file for complete search history.

(56) References Cited

U.S. PATENT DOCUMENTS

| | | | | |
|---|---|---|---|---|
| 8,600,434 B2 * | 12/2013 | Han | ...................... | H04W 48/16 370/315 |
| 8,731,590 B2 * | 5/2014 | Hakola | ................. | H04W 72/10 370/329 |
| 2012/0184267 A1 | 7/2012 | Dwyer et al. | | |
| 2013/0322413 A1 * | 12/2013 | Pelletier | ............ | H04W 72/1289 370/336 |
| 2014/0162685 A1 * | 6/2014 | Edge | ..................... | H04W 4/023 455/456.1 |
| 2014/0192739 A1 * | 7/2014 | Liao | ...................... | H04W 60/04 370/329 |
| 2016/0014590 A1 | 1/2016 | Agiwal et al. | | |
| 2016/0073335 A1 * | 3/2016 | Liao | ...................... | H04W 48/18 370/329 |
| 2017/0013648 A1 | 1/2017 | Jung et al. | | |

OTHER PUBLICATIONS

IEEE Xplore Digital Library; RANC: Relay-aided network-coded D2D network.
3rd Generation Partnership Project, Proximity-based Services, 3GPP TS 23.303, Version 15.0.0 (Jun. 2017).

* cited by examiner

*Primary Examiner* — Sharad Rampuria
(74) *Attorney, Agent, or Firm* — Duft Bornsen & Fettig, LLP

(57) ABSTRACT

Systems and methods for prioritizing mobile networks for proximity services. One embodiment is a proximity service server that receives an authorization request from User Equipment (UE) for a proximity service, identifies a plurality of authorized mobile networks that are authorized for the UE for the proximity service, and prioritizes the authorized mobile networks for the UE based on priority criteria to assign priority codes to the authorized mobile networks. The proximity service server formats an authorization response for the proximity service with authorization information for the UE that indicates the priority codes assigned to the authorized mobile networks, and transmits the authorization response to the UE.

18 Claims, 9 Drawing Sheets

PRIORITIZATION OF MOBILE NETWORKS FOR PROXIMITY SERVICES

FIELD OF THE INVENTION

The invention is related to the field of communication systems and, in particular, to proximity services.

BACKGROUND

Proximity services or proximity-based services refer to services provided between devices (i.e., User Equipment (UE)) being in proximity to each other. Proximity services utilize the radio technologies of the UEs so that the UEs in close proximity can exchange communications directly with one another without going through the core network, which is also referred to as device-to-device (D2D) communications. A UE is considered in "proximity" of another UE if they are able to establish direct communications.

The Third Generation Partnership Program (3GPP) has defined Proximity Services (ProSe) for a Long Term Evolution (LTE) network. ProSe allows for D2D communications as an underlay to the cellular network. In D2D communications, UEs transmit data signals to each other over a direct link using the cellular resources instead of routing the data signals through the core network. Therefore, D2D communications involve directly transmitting traffic between UEs that are in the vicinity of one another instead of routing the traffic over a core network, such as the Evolved Packet Core (EPC). Because there is direct communication between UEs that are in close proximity, D2D communications offload traffic from the EPC network without additional infrastructure. D2D communications may also offer higher data rates, lower transfer delays, and better power efficiency within a UE.

Proximity services generally include direct discovery, direct communication, and UE-to-network relay. Direct discovery is a function where a UE identifies other UEs that are in proximity. Direct communication is a function where UEs in proximity are able to communicate using local radio resources. UE-to-network relay is a function where a UE can relay traffic from a remote UE to the network, or from the network to the remote UE. For example, if a UE (referred to as a remote UE) is outside of the coverage area of the base stations for a network, then the UE-to-network relay function allows the remote UE to transmit traffic to a relay UE that is in the coverage area of a base station through a direct communication with the relay UE. The relay UE in turn forwards the traffic from the remote UE to the network by communicating with a base station of the network.

SUMMARY

Embodiments described herein provide mechanisms for prioritizing mobile networks (e.g., Public Land Mobile Networks (PLMNs)) for UEs that access or attempt to access proximity services. When multiple PLMNs are available, a proximity service function prioritizes the PLMNs so that the UE is able to select a PLMN to use for a proximity service. The UE may use radio resources of the selected PLMN (i.e., communicate with a base station) for discovery, direct communication, etc., may receive control signals from the selected PLMN to provision the UE with PLMN-specific parameters for a proximity service, or otherwise access the selected PLMN to facilitate proximity services. Thus, the proximity service function is able to steer proximity services toward a preferred PLMN.

One embodiment comprises a proximity service server that includes an interface component, and a processor that implements a proximity service function. The proximity service function is configured to receive an authorization request from a UE for a proximity service through the interface component, to identify a plurality of authorized mobile networks that are authorized for the UE for the proximity service, to prioritize the authorized mobile networks for the UE based on priority criteria to assign priority codes to the authorized mobile networks, to format an authorization response for the proximity service with authorization information for the UE that indicates the priority codes assigned to the authorized mobile networks, and to transmit the authorization response to the UE through the interface component.

In another embodiment, the proximity service function is configured to determine network conditions for the authorized mobile networks, and to prioritize the authorized mobile networks for the UE based on the network conditions.

In another embodiment, the proximity service function is configured to determine UE conditions for the UE, and to prioritize the authorized mobile networks for the UE based on the UE conditions.

In another embodiment, the authorization information includes a list of the authorized mobile networks, the priority codes assigned to the authorized mobile networks, and a validity timer for the authorization information.

In another embodiment, the proximity service function, before the validity timer for the authorization information expires, is configured to monitor at least one of network conditions for the authorized mobile networks and UE conditions for the UE, to process the priority criteria and the at least one of the network conditions and the UE conditions to determine whether to trigger an update to the authorization information, to re-prioritize the authorized mobile networks for the UE based on the priority criteria and the at least one of the network conditions and the UE conditions responsive to a determination to trigger the update, and to transmit a notification to the UE through the interface component with updated authorization information that includes updated priority codes assigned to the authorized mobile networks.

In another embodiment, the proximity service function is configured to query a Home Subscriber Server (HSS) for a subscriber profile associated with the UE through the interface component, and to identify the authorized mobile networks that are authorized for the UE from the subscriber profile. The proximity service function is configured to update the subscriber profile in the HSS with the priority codes assigned to the authorized mobile networks.

Another embodiment comprises a method that includes receiving (in a proximity service server) an authorization request from a UE for a proximity service, identifying a plurality of authorized mobile networks that are authorized for the UE for the proximity service, prioritizing the authorized mobile networks for the UE based on priority criteria to assign priority codes to the authorized mobile networks, formatting an authorization response for the proximity service with authorization information for the UE that indicates the priority codes assigned to the authorized mobile networks, and transmitting the authorization response from the proximity service server to the UE.

In another embodiment, the method further comprises determining network conditions for the authorized mobile networks, and prioritizing the authorized mobile networks for the UE based on the network conditions.

In another embodiment, the method further comprises determining UE conditions for the UE, and prioritizing the authorized mobile networks for the UE based on the UE conditions.

In another embodiment, before the validity timer for the authorization information expires, the method further comprises monitoring at least one of network conditions for the authorized mobile networks and UE conditions for the UE, processing the priority criteria and the at least one of the network conditions and the UE conditions to determine whether to trigger an update to the authorization information, re-prioritizing the authorized mobile networks for the UE based on the priority criteria and the at least one of the network conditions and the UE conditions responsive to a determination to trigger the update, and transmitting a notification to the UE with updated authorization information that includes updated priority codes assigned to the authorized mobile networks.

In another embodiment, the method further comprises querying a Home Subscriber Server (HSS) for a subscriber profile associated with the UE, identifying the authorized mobile networks that are authorized for the UE from the subscriber profile, and updating the subscriber profile in the HSS with the priority codes assigned to the authorized mobile networks.

Another embodiment comprises User Equipment (UE) of an end user. The UE includes a radio interface component configured to exchange over-the-air signals, and a processor that implements an application for a proximity service, and that implements an authorization module for the proximity service. The authorization module is configured to format an authorization request for the proximity service, to transmit the authorization request to a proximity service server through the radio interface component, and to receive an authorization response from the proximity service server through the radio interface component with authorization information for the proximity service, wherein the authorization information includes a list of authorized mobile networks that are authorized for the UE for the proximity service, priority codes assigned to the authorized mobile networks, and a validity timer for the authorization information. The authorization module is configured to select one of the authorized mobile networks for the proximity service based on the priority codes assigned to the authorized mobile networks. The application is configured to access the one of the authorized mobile networks for the proximity service through the radio interface component.

In another embodiment, the authorization module is configured to insert information on UE conditions in the authorization request.

In another embodiment, the authorization module is configured to select the one of the authorized mobile networks that is assigned the highest priority code among the authorized mobile networks.

In another embodiment, before the validity timer for the authorization information expires, the authorization module is configured to monitor at least one of UE conditions for the UE and network conditions for the authorized mobile networks, to process priority criteria and the at least one of the UE conditions and the network conditions to determine whether to trigger an update to the authorization information, to transmit an update request to the proximity service server through the radio interface component responsive to a determination to trigger the update, and to receive an update response from the proximity service server through the radio interface component with updated authorization information. The updated authorization information includes updated priority codes assigned to the authorized mobile networks.

Another embodiment comprises a method that includes formatting (at a UE) an authorization request for a proximity service, transmitting the authorization request from the UE to a proximity service server, and receiving an authorization response in the UE from the proximity service server with authorization information for the proximity service, wherein the authorization information includes a list of authorized mobile networks that are authorized for the UE for the proximity service, priority codes assigned to the authorized mobile networks, and a validity timer for the authorization information. The method further includes selecting one of the authorized mobile networks for the proximity service based on the priority codes assigned to the authorized mobile networks, and accessing the one of the authorized mobile networks for the proximity service.

In another embodiment, the method further includes inserting information on UE conditions in the authorization request.

In another embodiment, the step of selecting one of the authorized mobile networks comprises selecting the one of the authorized mobile networks that is assigned the highest priority code among the authorized mobile networks.

In another embodiment, before the validity timer for the authorization information expires, the method further includes monitoring at least one of UE conditions for the UE and network conditions for the authorized mobile networks, processing priority criteria and the at least one of the UE conditions and the network conditions to determine whether to trigger an update to the authorization information, transmitting an update request to the proximity service server responsive to a determination to trigger the update, and receiving an update response from the proximity service server with updated authorization information, The updated authorization information includes updated priority codes assigned to the authorized mobile networks.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
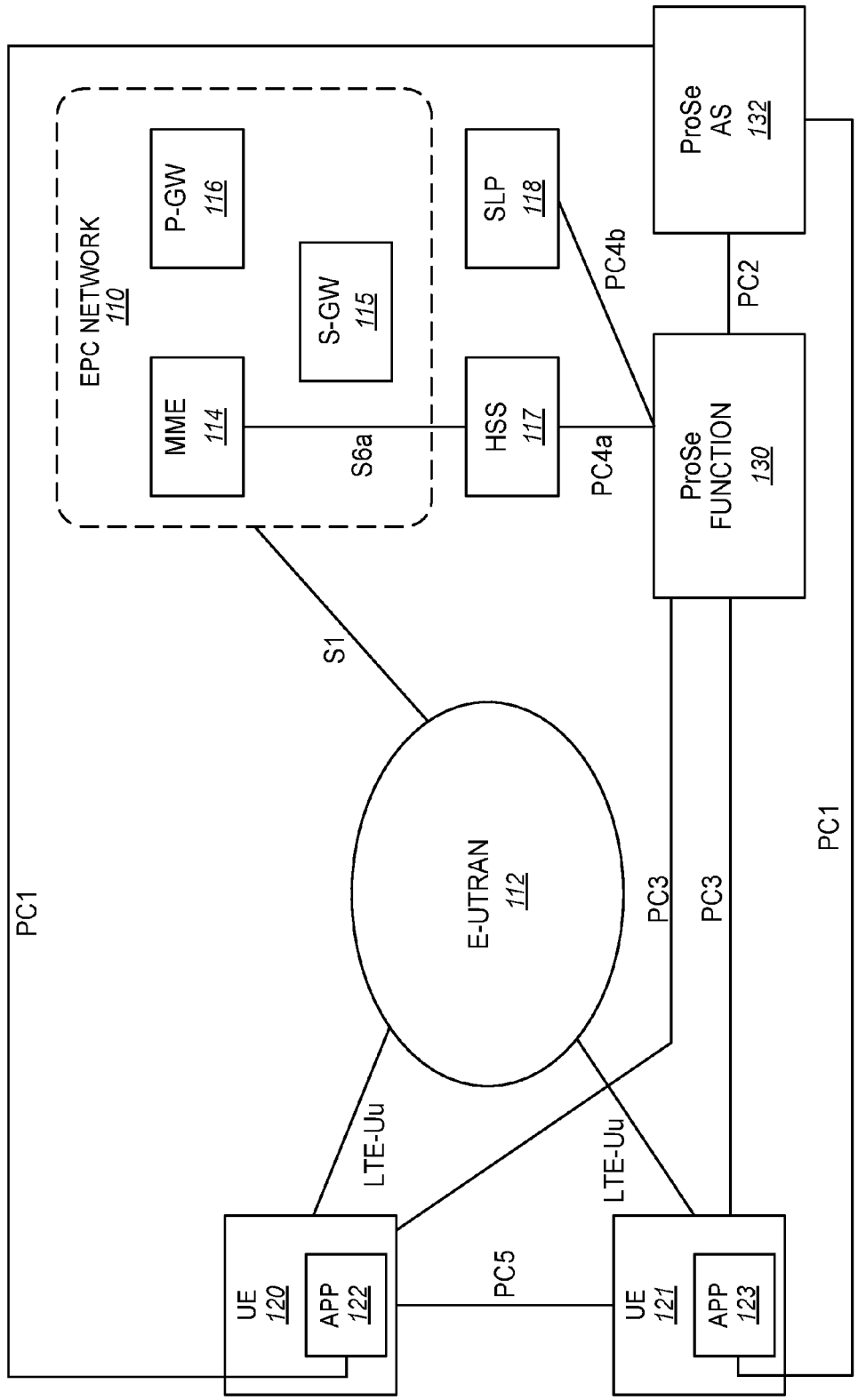
FIG. 1 illustrates an architecture for ProSe features in an LTE network.

FIG. 1 illustrates an architecture 100 for ProSe features in an LTE network. Architecture 100 illustrates a non-roaming scenario in a Public Land Mobile Network (PLMN)) as described in 3GPP TS 23.303 (version 15.0.0), which is incorporated by reference as if fully included herein. Architecture 100 includes an Evolved Packet Core (EPC) network 110 that communicates with UEs 120-121 over a Radio Access Network (RAN), which is illustrated as an Evolved-UMTS Terrestrial Radio Access Network (E-UTRAN) 112. Although not shown in FIG. 1, E-UTRAN 112 includes a plurality of base stations (e.g., eNodeB) that provide wireless connections between UEs 120-121 (and other UEs) and EPC network 110. EPC network 110 includes a Mobility Management Entity (MME) 114, an S-GW 115, and a P-GW 116. Architecture 100 also includes a Home Subscriber Server (HSS) 117 and a Secure User Plane Location Platform (SLP) 118. HSS 117 stores subscription information for UEs 120-121 in the form of subscriber profiles. SLP 118 maintains location information for UEs 120-121.

Architecture 100 further includes a Proximity Service (ProSe) function 130 and a ProSe Application Server (AS) 132. ProSe AS 132 supports storage of EPC ProSe User IDs and ProSe Function IDs, and mapping of Application Layer User IDs and EPC ProSe User IDs. ProSe function 130 is a logical function that is used for network-related actions required for ProSe. ProSe function 130 plays different roles for each of the features of ProSe. There may be one ProSe function 130 in each PLMN that supports proximity services. ProSe function 130 includes three main sub-functions that perform different roles depending on the ProSe feature. One sub-function is a Direct Provisioning Function (DPF) that is used to provision a UE with parameters in order use direct discovery and direct communication. The DPF provisions the UEs with PLMN-specific parameters that allow the UEs to use proximity services in this specific PLMN. Another sub-function is a direct discovery name management function, which is used for open direct discovery to allocate and process the mapping of Applications IDs and Application Codes used in direct discovery. The direct discovery name management function uses subscriber data stored in HSS 117 for authorization for each discovery request from a UE. In restricted direct discovery, the direct discovery name management function interacts with ProSe AS 132 for authorization of the discovery requests. Another sub-function is an EPC-level discovery ProSe function, which authorizes and configures UEs for EPC-level ProSe discovery and EPC-assisted WLAN direct discovery and communication. The reference point (PC4a) between HSS 117 and ProSe function 130 is used to provide subscription information in order to authorize access for direct discovery and direct communication on a per-PLMN basis.

UEs 120-121 may be considered as ProSe-enabled, meaning that they support ProSe requirements and associated procedures. A ProSe-enabled UE as described herein refers to both a non-Public Safety UE and a Public Safety UE. UEs 120-121 include an application 122-123, respectively, that is used to access/provide proximity services. Applications 122-123 may comprise a local voice service, multimedia content sharing, gaming, group multicast, content-aware applications, public safety, etc. UEs 120-121 support the following functions: exchange of ProSe control information between the UE and ProSe function 130 over the PC3 reference point, procedures for open and restricted direct discovery of other UEs over the PC5 reference point, procedures for one-to-one or one-to-many direct communication over the PC5 reference point, and procedures to act as a UE-to-network relay.

Proximity services as discussed herein include the following functions: discovery, direct communication (D2D), and UE-to-network relay. Discovery is a process that identifies a UE in proximity of other UEs. One type of discovery is direct discovery, which is a process employed by a UE to discover other UEs in its vicinity by using only the capabilities of the two UEs. For example, one UE may use local radio resources to discover the presence of other UEs in its vicinity. Another type of discovery is referred to as EPC-level discovery, which is a process by which EPC network 110 determines the proximity of two UEs and informs them of their proximity. For example, a server in EPC network 110 may monitor the location of UEs, and inform the UEs of their proximity.

Direct communication is a communication between two or more UEs in proximity by means of user data plane transmissions using radio technology (e.g., E-UTRA) via a channel not traversing any network node (other than possibly a base station of a RAN). Direct communication allows the UEs to use local radio resources to communicate directly with each other without routing traffic through a core network, such as EPC network 110. For example, UEs may directly communicate through the radio resources available to both UEs from a RAN, such as from a base station. UEs may also directly communicate through the radio resources of the UEs themselves, such as over the PC5 reference point. Either way, the traffic exchanged between the UEs is not routed through the core network, but is routed directly between the UEs over a wireless interface.

Figure 2:
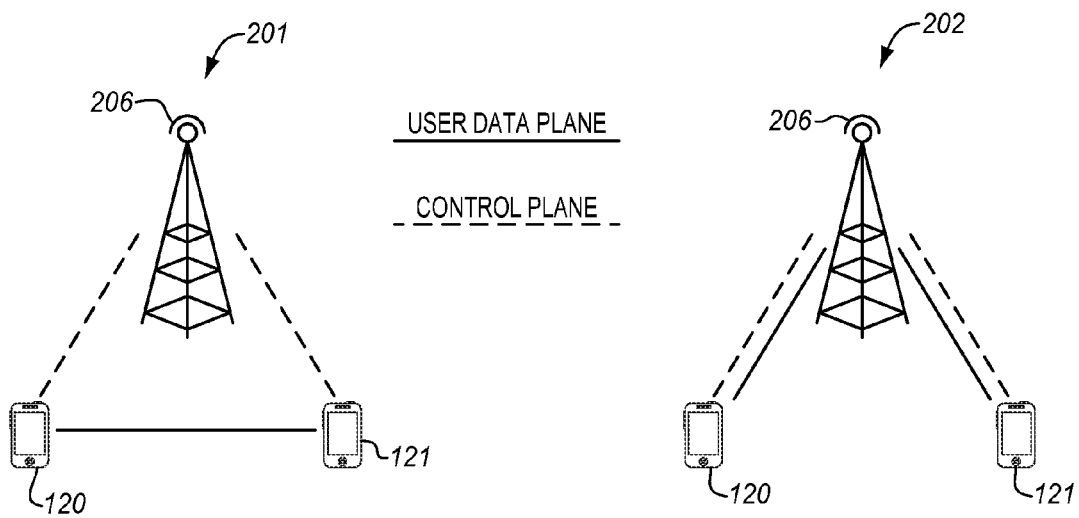
FIG. 2 illustrates direct communication scenarios between two UEs.

FIG. 2 illustrates direct communication scenarios between two UEs. In scenario 201, a base station 206 is in communication with UEs 120-121. Base station 206 communicates with UEs 120-121 over the control plane (also referred to as control path or control channel) to exchange signaling messages and other types of control messages with UEs 120-121. UEs 120-121 are able to establish a direct communication over a user data plane (also referred to as a data path or data channel) using local radio resources to communicate directly with each other without routing traffic through a core network. In scenario 202, base station 206 again communicates with UEs 120-121 over the control plane to exchange signaling messages and other types of control messages with UEs 120-121. UEs 120-121 are able to establish a direct communication over the user data plane through base station 206 without routing traffic through a core network. In each of the above scenarios, UEs 120-121 establish a direct communication between each other, which is also referred to herein as a D2D communication.

In FIG. 1, the other function of proximity services is UE-to-network relay. UE-to-network relay is a function where one UE provides functionality to support connectivity to "unicast" services for one or more remote UEs. A remote UE refers to a UE that is not served by a RAN (e.g., E-UTRAN), and communicates with a Packet Data Network (PDN) through a UE-to-network relay. For instance, if a remote UE is out-of-coverage of a RAN, then the remote UE may still access the PDN through another UE (relay UE) that is in-coverage of the RAN. A relay UE is a device that is enabled for UE-to-network relay. UE-to-network relay allows for one-to-one or one-to-many communications from the network to a remote UE via a relay UE which is in-coverage, or from a remote UE to the network via a relay UE that is in-coverage.

Figure 3:
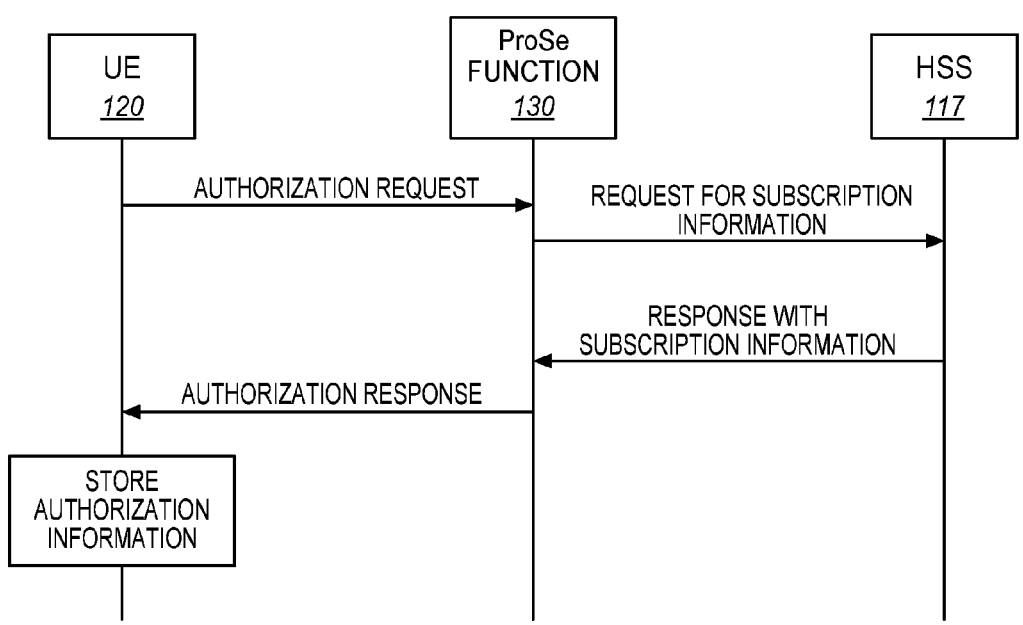
FIG. 3 illustrates an authorization procedure for a UE.

In order to access a proximity service, a UE has to first be authorized and configured for the service. A UE performs an authorization procedure before starting the setup of direct discovery or direct communication, when a UE is already engaged in a direct discovery or direct communication but changes its registered PLMN, or when a prior authorization expires. FIG. 3 illustrates an authorization procedure for a UE 120. UE 120 gets authorization for direct discovery, direct communication, or both with a given validity time from ProSe function 130 of its home PLMN (HPLMN). To identify ProSe function 130 of its HPLMN, UE 120 may interact with a Domain Name Service (DNS) function (not shown) to discover ProSe function 130, or information for ProSe function 130 may be pre-provisioned in UE 120. UE 120 transmits an authorization request for direct discovery, direct communication, or both to ProSe function 130 in the HPLMN. In response to the authorization request, ProSe function 130 transmits a request for subscription information (e.g., a subscriber profile) associated with UE 120 to HSS 117, assuming that ProSe function 130 does not already have this information for UE 120. HSS 117 identifies subscription information for UE 120 that is related to proximity services (e.g., direct discovery and/or direct communication), and transmits a response to ProSe function 130 with the subscription information. ProSe function 130 then sends an authorization response to UE 120 with authorization information for a proximity service, which is stored by UE 120. UE 120 may perform direct discovery and/or direct communications using a PLMN that is authorized by ProSe function 130.

One problem with the authorization procedure described above is that the authorization information may indicate multiple PLMNs that are available and authorized to UE 120, but UE 120 does not know which of the authorized PLMNs to use for direct discovery and/or direct communication. In the embodiments described herein, an enhanced architecture is provided that prioritizes PLMNs that are authorized to UEs for proximity services.

Figure 4:
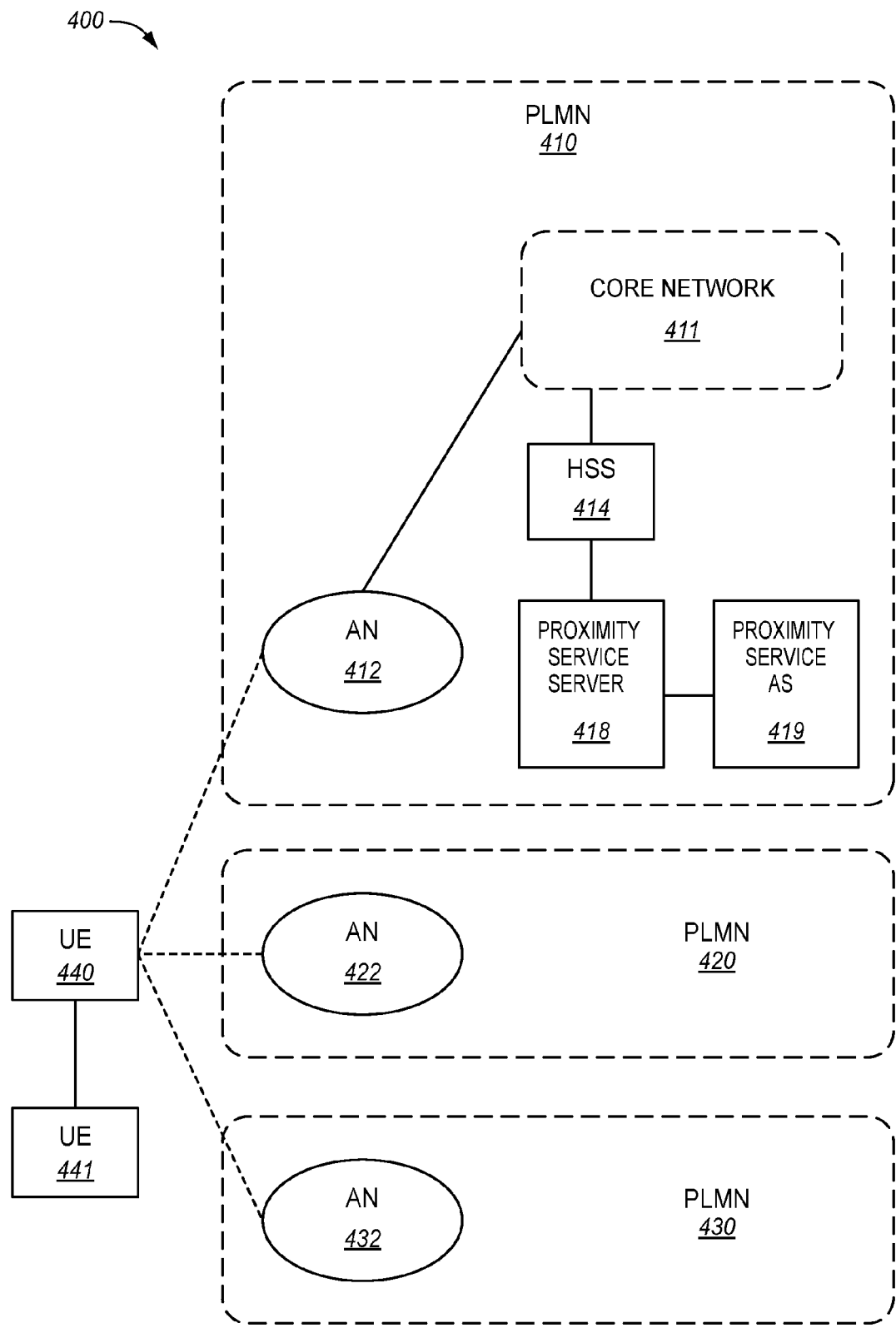
FIG. 4 illustrates an architecture for proximity services in an exemplary embodiment.

FIG. 4 illustrates an architecture 400 for proximity services in an exemplary embodiment. Architecture 400 may have similar elements and reference points as architecture 100 shown in FIG. 1. Architecture 400 may be implemented for 4G (e.g., LTE) or next-generation networks (e.g., 5G).

Architecture 400 includes a plurality of mobile networks, illustrated as PLMN 410, 420, and 430, although more or less PLMNs may be included. PLMN 410 is the home PLMN (HPLMN) of UE 440, and includes a core network 411, an access network (AN) 412, an HSS 414, a proximity service server 418, and a proximity service AS 419. Core network 411 is the central part of PLMN 410 that provides various services to subscribers who are connected by access network 412 through a UE. One example of core network 411 is an EPC network that includes an MME, an S-GW, and a P-GW as shown in FIG. 1. Access network 412 connects UEs with core network 411. Access network 412 may use radio access technology to communicate with UEs, such as 3G, 4G, LTE, WiFi, etc. Although not shown in FIG. 4, access network 412 may include one or more base stations (e.g., eNodeB) that operate on the licensed spectrum, one or more Wireless Access Points (WAP) that operate on the unlicensed spectrum, or a combination of the two. HSS 414 is a database or set of databases that stores subscription information for subscribers in the form of subscriber profiles. Proximity service server 418 is an element of PLMN 410 that controls proximity services. Proximity service AS 419 supports proximity service server 418 by storing various information used for proximity services.

PLMN 420 and PLMN 430 may have similar elements as described above for PLMN 410. PLMN 420 includes an access network 422, and PLMN 430 includes an access network 432. PLMN 420 and PLMN 430 may act as a serving PLMN or visited-PLMN (VPLMN) for UE 440, or a local PLMN. A serving PLMN or VPLMN is a PLMN in which a UE is registered and is receiving service. A local PLMN is a PLMN which is not the serving PLMN of a UE, but whose radio resources is authorized by the HPLMN to engage in proximity services.

UE 440 and UE 441 are both enabled for proximity services. In this embodiment, there may be multiple PLMNs available to UEs 440-441 for proximity services. Regardless of which PLMNs are available to UEs 440-441, they will contact the proximity service server 418 in their HPLMN to receive authorization for a proximity service. Proximity service server 418 and UEs 440-441 are enhanced in the following embodiments to prioritize the PLMNs that are authorized for a UE 440-441.

Figure 5:
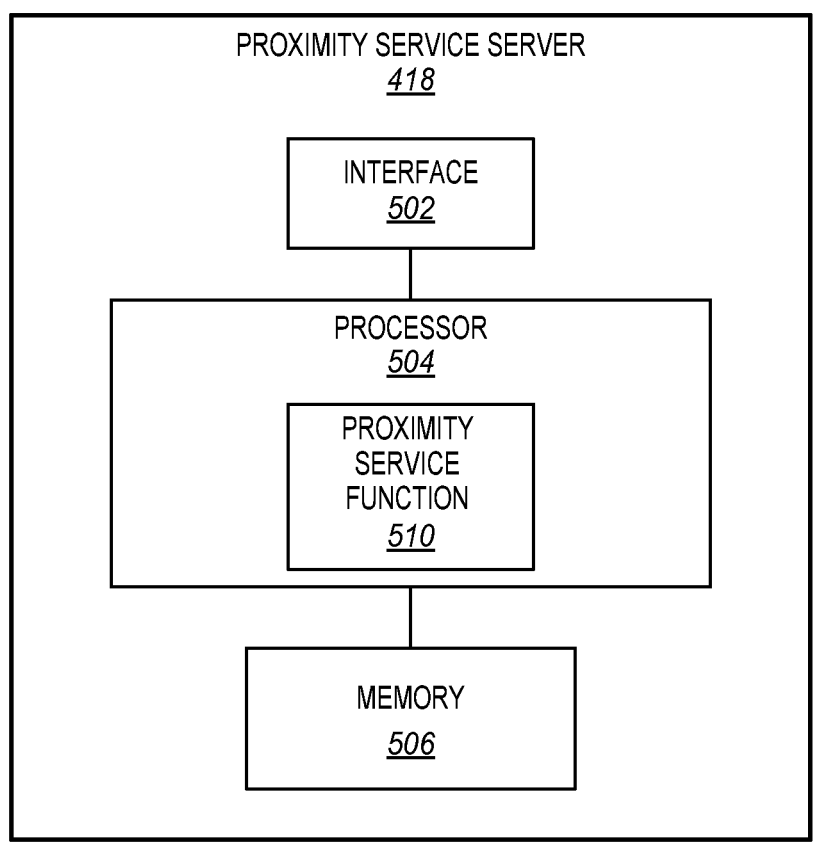
FIG. 5 is a block diagram of a proximity service server in an exemplary embodiment.

FIG. 5 is a block diagram of proximity service server 418 in an exemplary embodiment. Proximity service server 418 is an element of a mobile network (e.g., PLMN 410) that is configured to control proximity services for UEs. Proximity service server 418 includes an interface component 502, one or more processors 504, and a memory 506. Interface component 502 is a hardware component configured to communicate with a variety of elements. For example, interface component 502 may be configured to communicate with HSS 414, such as over the PC4a reference point. Interface component 502 may be configured to communicate with proximity service AS 419, such as over the PC2 reference point. Interface component 502 may be configured to communicate with UEs 440-441, such as over the PC3 reference point. Processor 504 represents the internal circuitry, logic, hardware, etc., that provides the functions of proximity service server 418. Memory 506 is a computer readable storage medium (e.g., ROM or flash memory) for data, instructions, applications, etc., and is accessible by processor 504. Proximity service server 418 may include various other components not specifically illustrated in FIG. 5.

Processor 504 implements a proximity service function 510 (also referred to as a ProSe function) that is configured to control proximity services. Proximity service function 510 is configured to provide a list of PLMNs that are authorized for a UE for a proximity service. Proximity service function 510 is enhanced in this embodiment to prioritize the PLMNs that are authorized for the UE. Proximity service function 510 may query HSS 414 to identify the PLMNs that are authorized for a UE, such as in a subscriber profile associated with the UE. Proximity service function 510 may then process priority criteria to prioritize the PLMNs that are authorized for the UE. The priority criteria may take into the account a variety of parameters, such as network conditions, UE conditions, etc., to prioritize the PLMNs.

Figure 6:
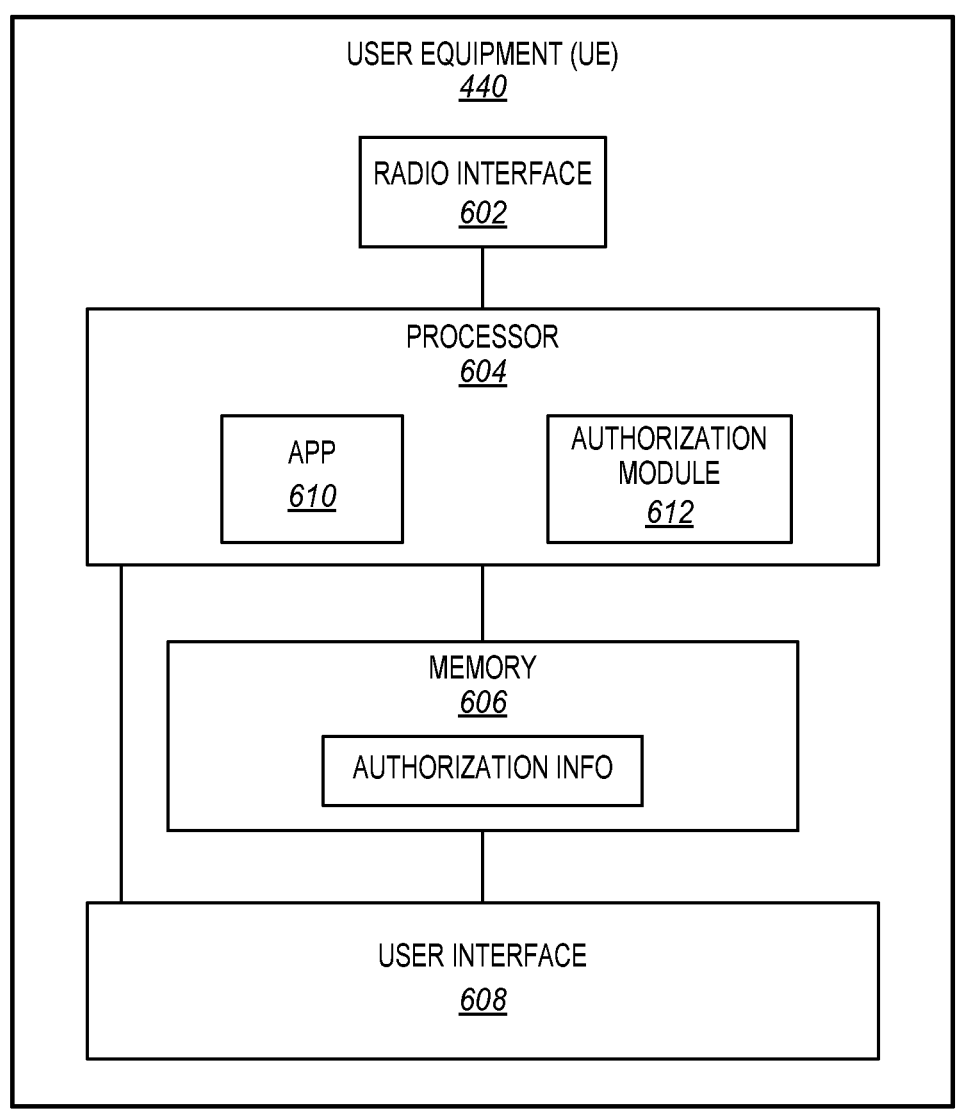
FIG. 6 is a block diagram of User Equipment (UE) in an exemplary embodiment.

FIG. 6 is a block diagram of UE 440 in an exemplary embodiment. UE 440 is an apparatus or device used directly by an end user for communication, and includes a radio interface component 602, one or more processors 604, a memory 606, and a user interface component 608. Radio interface component 602 is a hardware component that represents the local radio resources of UE 440, such as transceivers and antennas, used for wireless communications with an access network via radio or "over-the-air" signals. Processor 604 represents the internal circuitry, logic, hardware, software, etc., that provides the functions of UE 440. Memory 606 is a computer readable storage medium for data, instructions, applications, etc., and is accessible by processor 604. User interface component 608 is a hardware component for interacting with an end user. For example, user interface component 608 may include a screen or touch screen (e.g., a Liquid Crystal Display (LCD), a Light Emitting Diode (LED) display, etc.), a keyboard or keypad, a tracking device (e.g., a trackball or trackpad), a speaker, and a microphone. UE 440 may include various other components not specifically illustrated in FIG. 6. UE 441 may have a similar configuration as UE 440.

Processor 604 implements one or more applications (APP) 610 that access or provide proximity services, such as direct discovery and direct communication. Processor 604 also implements an authorization module 612, which provides a mechanism for identifying authorized PLMNs for UE 440, and selecting one of the authorized PLMNs for a proximity service.

Figure 7:
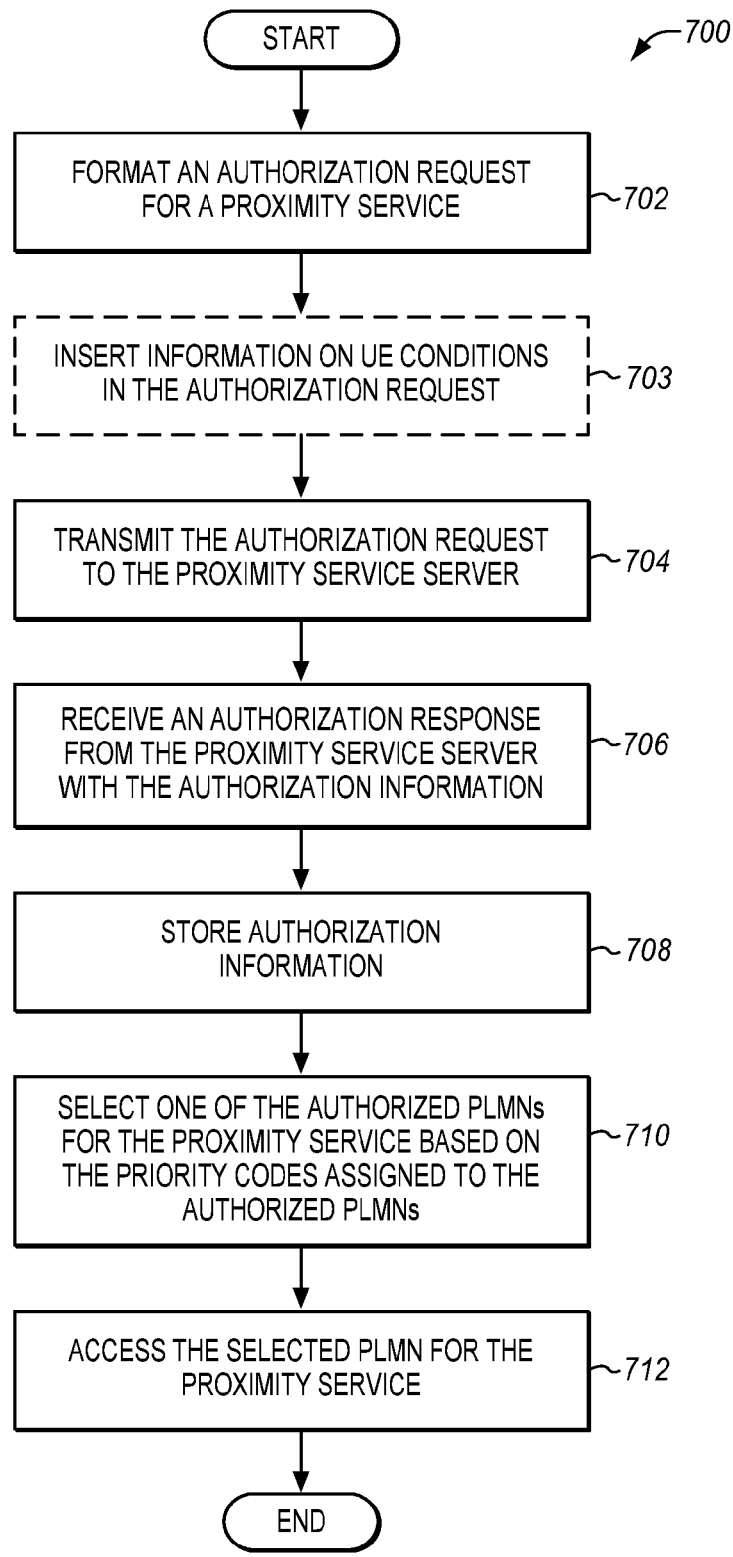
FIG. 7 is a flow chart illustrating a method performed in a UE for an authorization procedure in an exemplary embodiment.
Figure 8:
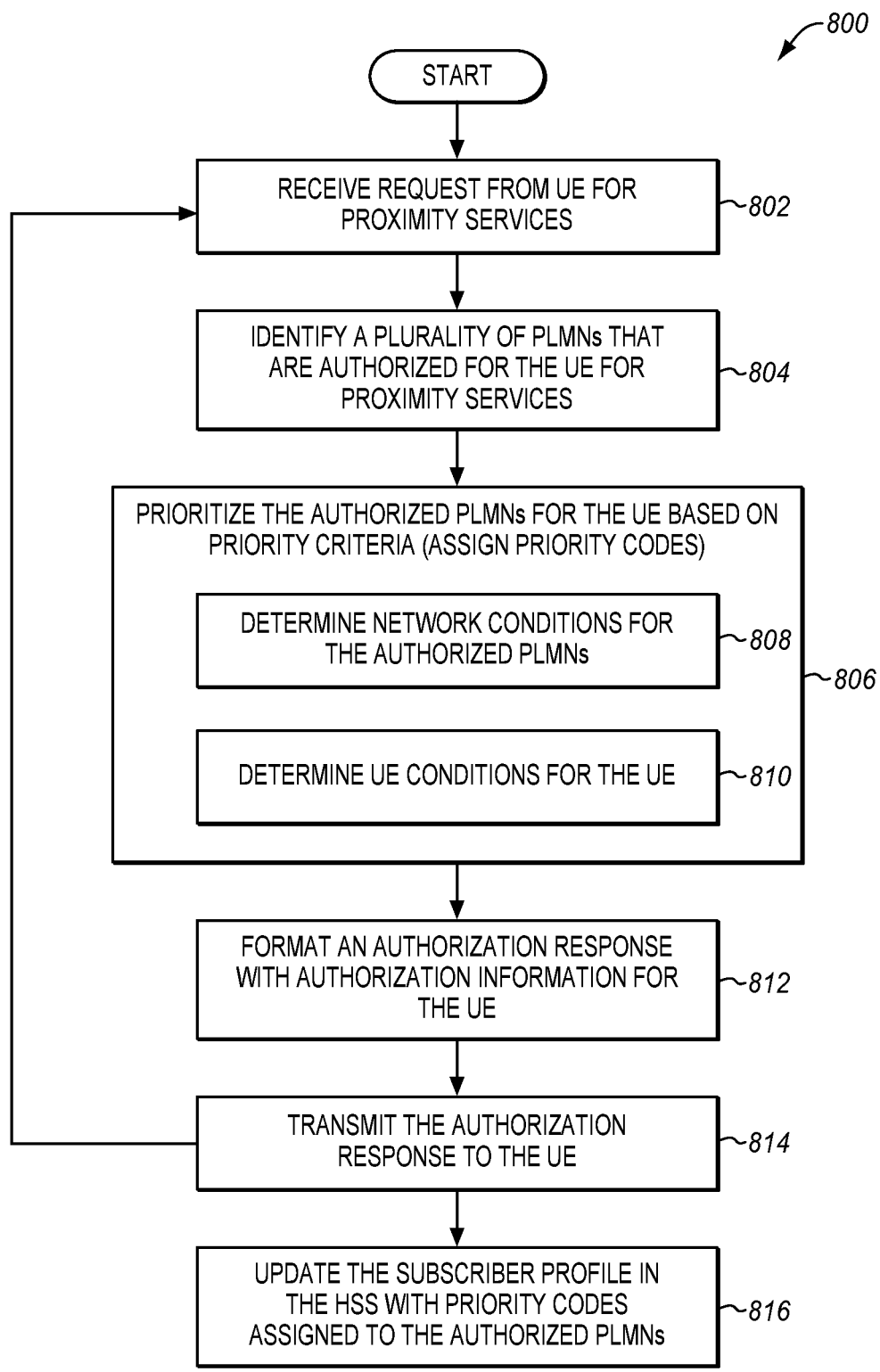
FIG. 8 is a flow chart illustrating a method performed in a proximity service server for an authorization procedure in an exemplary embodiment.

In the embodiments described herein, UE 440 and proximity service server 418 are enhanced for the authorization procedure. Further details of the enhancements to these elements are described in FIGS. 7-8. FIG. 7 is a flow chart illustrating a method 700 performed in UE 440 for an authorization procedure in an exemplary embodiment. The steps of method 700 will be described with reference to UE 440 in FIG. 6, but those skilled in the art will appreciate that method 700 may be performed in other devices. FIG. 8 is a flow chart illustrating a method 800 performed in proximity service server 418 for the authorization procedure in an exemplary embodiment. The steps of method 800 will be described with reference to proximity service server 418 in FIG. 5, but those skilled in the art will appreciate that method 800 may be performed in other elements. The steps of the flow charts described herein are not all inclusive and may include other steps not shown, and the steps may be performed in an alternative order.

Before application 610 in UE 440 is able to perform a proximity service, authorization module 612 accesses the HPLMN for UE 440 to obtain authorization for the proximity service. For the authorization procedure in FIG. 7, authorization module 612 in UE 440 formats an authorization request for the proximity service (step 702). The authorization request may be for direct discovery, direct communication, and/or another proximity service. Authorization module 612 may optionally collect information on UE conditions, and insert the information on UE conditions in the authorization request (step 703). UE conditions are settings, states, operational parameters, etc., of UE 440 that affect the performance of UE 440 in providing proximity services. For example, UE conditions may include data regarding PLMNs available to a UE, location, signal strength level of cells in range, UE battery level, application usages, accounting and charging information, predicted application packet flow and timer, relay-based communication, matching of radio and/or security parameters, etc. Authorization module 612 then transmits the authorization request to proximity service server 418 through radio interface component 602 (step 704).

In FIG. 8, proximity service server 418 receives the authorization request for the proximity service from UE 440 through interface component 502 (step 802). In response to the authorization request, proximity service function 510 of proximity service server 418 determines authorization information for UE 440. For the authorization information, proximity service server 418 identifies a plurality of PLMNs that are authorized for UE 440 for proximity services (step 804). If a context already exists for UE 440, then proximity service server 418 may already have information stored regarding the authorized PLMNs for UE 440. Thus, proximity service function 510 may access memory 506 to retrieve a list of authorized PLMNs for UE 440. If no context exists for UE 440, then proximity service function 510 may retrieve a subscriber profile for UE 440 from HSS 414 (see FIG. 4), and process the subscriber profile to identify the authorized PLMNs for UE 440.

For the authorization information, proximity service function 510 also prioritizes the authorized PLMNs for UE 440 based on priority criteria (step 806). The priority criteria may be associated per PLMN authorized for UE 440 and/or may be general criteria defined for one or more network operators. To prioritize the PLMNs, proximity service function 510 assigns a priority code to each of the authorized PLMNs. The priority codes may indicate a priority level, such as high priority, medium priority, low priority, etc. Alternatively, the priority codes may indicate a preferred order of the authorized PLMNs. To prioritize the authorized PLMNs, proximity service function 510 may determine network conditions for the authorized PLMNs (step 808). Network conditions are properties, operational parameters, etc., that affect the performance of a PLMN to provide proximity services. For example, network conditions may include PLMN technology (e.g., EPC, WLAN, NGC, unlicensed spectrums, etc.), security levels, geographical areas, network traffic level (e.g., congested or uncongested), network element resource consumption, network energy saving, number of UEs accessing proximity services within a serving cell, accounting and charging policy, UE signal strength level (coverage range), relay-based communication, handover policy, etc. To determine the network conditions, proximity service function 510 may query each of the authorized PLMNs to acquire information on network conditions.

Proximity service function 510 may optionally determine UE conditions for UE 440 (step 810). To determine the UE conditions, proximity service function 510 may query UE 440 or process the authorization request from UE 440. Proximity service function 510 may determine the location of UE 440 to identify the PLMNs that are available to UE 440. For example, if UE 440 is located within the coverage area of PLMN 420 and PLMN 430 in FIG. 4, then proximity service function 510 will identify these PLMNs as available. Proximity service function 510 may process any of this information in conjunction with the priority criteria to assign a priority code to the authorized PLMNs.

Proximity service function 510 formats an authorization response for the proximity service with the authorization information for UE 440 (step 812). The authorization information indicates the authorized PLMNs for UE 440, and the priorities (i.e., priority codes) of the authorized PLMNs. The authorization information may also include the network conditions, the priority criteria used in determining the priority of the authorized PLMNs (the priority criteria may be associated per PLMN), and a validity timer for the authorization information. Proximity service function 510 then transmits the authorization response to UE 440 through interface component 502 (step 814). Proximity service function 510 may also update the subscriber profile in HSS 414 with the priority codes assigned to the authorized PLMNs (step 816).

In FIG. 7, authorization module 612 in UE 440 receives the authorization response from proximity service server 418 through radio interface component 602 (step 706), and stores the authorization information (step 708). In this embodiment, the authorization information includes a list of authorized PLMNs, the priority codes assigned to the PLMNs, and the validity timer for the authorization information. Authorization module 612 selects one of the authorized PLMNs for the proximity service based on the priority codes assigned to the authorized PLMNs (step 710). For example, authorization module 612 may select the authorized PLMN assigned the highest priority code among the authorized PLMNs, or an authorized PLMN assigned a highest level of priority code. Application 610 in UE 440 then accesses the authorized PLMN selected in step 710 for the proximity service through radio interface component 602 (step 712). For example, application 610 may access the selected PLMN to provisioning information (e.g., radio parameters or frequency bands), control data, etc. In some scenarios, UE 440 may revoke or override the authorization information, such as in the case of an emergency situation for a public safety UE.

UE 440 may use the authorization information provided by proximity service server 418 for the duration of the validity timer. For example, if a new proximity service is requested by application 610, then authorization module 612 may select an authorized PLMN for the proximity service based on the authorization information. Authorization module 612 may select a new authorized PLMN for UE 440 based on the authorization information if UE 440 needs to switch or handover to another PLMN for a proximity service.

Figure 9:
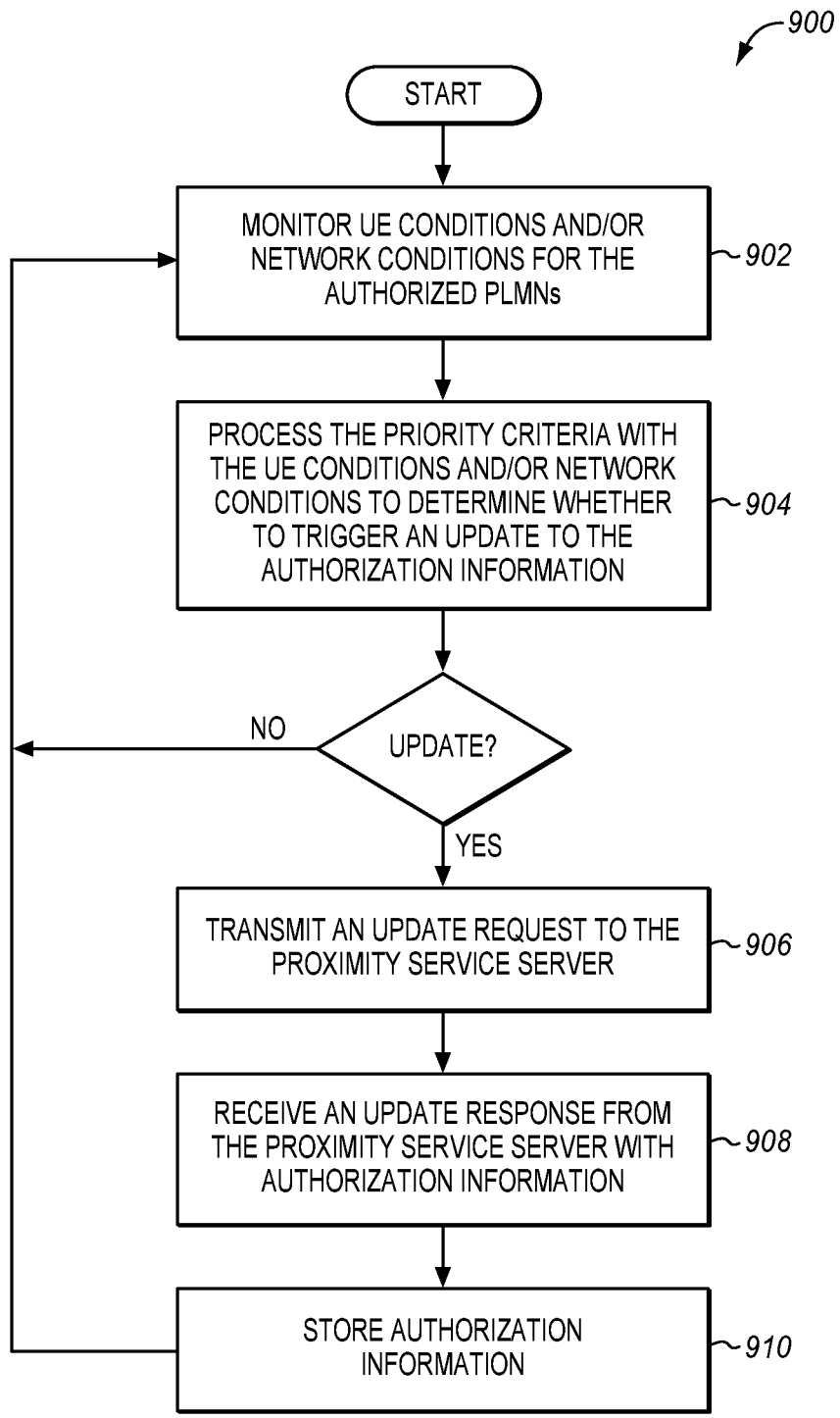
FIG. 9 is a flow chart illustrating a method of updating authorization information in an exemplary embodiment.

There may be instances where authorization module 612 in UE 440 requests an update to the authorization information before the validity timer expires. The update may occur before setup of a proximity service or during a proximity service. FIG. 9 is a flow chart illustrating a method 900 of updating authorization information in an exemplary embodiment. Authorization module 612 monitors UE conditions (e.g., signal strength) and/or network conditions (e.g., congestion) for the authorized PLMNs (step 902). Authorization module 612 processes the priority criteria with the UE conditions and/or network conditions to determine whether to trigger an update to the authorization information (step 904). As UE conditions and network conditions are dynamic, the priority of PLMNs may not be preferred for the UE conditions or network conditions during the validity timer of the authorization information. When the determination is to trigger an update, authorization module 612 transmits an update request to proximity service server 418 through radio interface component 602 (step 906). Authorization module 612 may report the UE conditions or network conditions in the update request.

In response to the update request, proximity service function 510 may process the priority criteria, network conditions, and/or UE conditions as described in FIG. 8 to prioritize the authorized PLMNs for UE 440. Proximity service function 510 may change the priority codes assigned to the authorized PLMNs based on present conditions, and send an update response to UE 440 with authorization information that may or may not be altered. Authorization module 612 receives the update response from proximity service server 418 through radio interface component 602 with the authorization information (step 908), and stores the authorization information (step 910). As above, the authorization information includes a list of authorized PLMNs, the priority codes assigned to the PLMNs, and a validity timer. The priority codes assigned to the PLMNs may have been changed by proximity service server 418 based on the update request from UE 440, and the present UE/network conditions. UE 440 may then operate substantially as described in FIG. 7 using the authorization information with the updated priority codes to select a PLMN for a proximity service.

Figure 10:
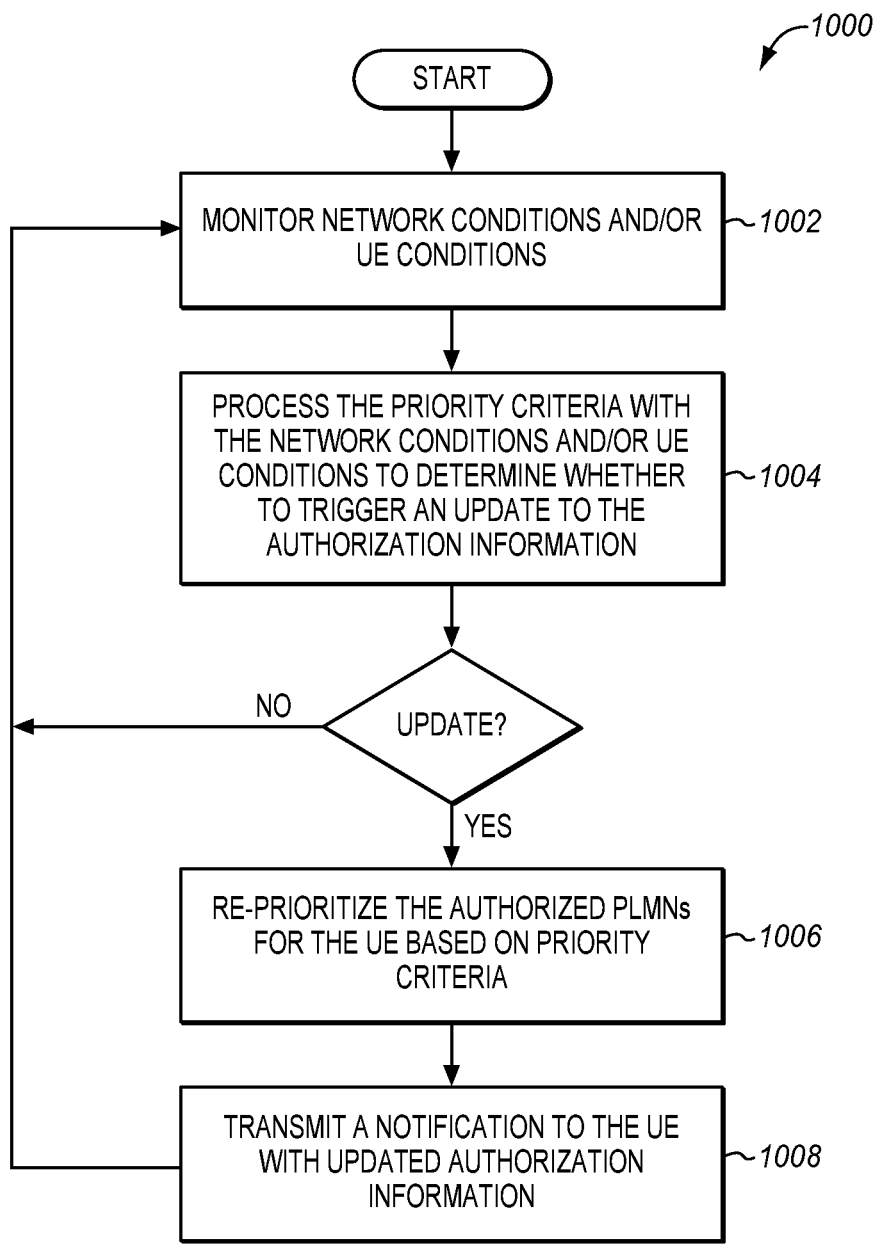
FIG. 10 is a flow chart illustrating a method of updating authorization information in an exemplary embodiment.

Proximity service server 418 may also initiate an update of the authorization information (i.e., priority codes) at any time before the validity timer expires. FIG. 10 is a flow chart illustrating a method 1000 of updating authorization information in an exemplary embodiment. Proximity service function 510 monitors network conditions and/or UE conditions (step 1002). In this step, proximity service function 510 may also monitor for changes in the priority criteria, or changes to the authorized PLMNs in the subscriber profile associated with UE 440. Proximity service function 510 processes the priority criteria with the network conditions and/or UE conditions to determine whether to trigger an update to the authorization information (step 1004). When the determination is to trigger an update, proximity service function 510 may process the priority criteria, network conditions, and UE conditions as described in FIG. 8 to re-prioritize the authorized PLMNs for UE 440 (step 1006). Proximity service function 510 may change the priority codes assigned to the authorized PLMNs based on present conditions. Proximity service function 510 then transmits a notification to UE 440 with updated authorization information (step 1008). As above, the updated authorization information includes a list of authorized PLMNs, the updated priority codes assigned to the PLMNs, and a validity timer. UE 440 may then operate substantially as described in FIG. 7 using the updated authorization information with the updated priority codes to select a PLMN for a proximity service.

The above embodiments advantageously prioritize the PLMNs that are authorized for a UE for a proximity service so that the UE selects a preferred PLMN for a proximity service. One technical benefit is that the network, through proximity service server 418, is able to influence which PLMN is used by a UE for a proximity service. The network can therefore offload some proximity services to WiFi networks, can push some proximity services to less congested networks, or otherwise shape how PLMNs are utilized for proximity services.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

What is claimed is:

1. A proximity service server comprising:
an interface component; and
a processor that implements a proximity service function configured to receive an authorization request from User Equipment (UE) for a proximity service through the interface component, to identify a plurality of authorized mobile networks that are authorized for the UE for the proximity service, to prioritize the authorized mobile networks for the UE based on priority criteria to assign priority codes to the authorized mobile networks, to format an authorization response for the proximity service with authorization information for the UE that indicates the priority codes assigned to the authorized mobile networks, and to transmit the authorization response to the UE through the interface component;
wherein the authorization information includes a list of the authorized mobile networks, the priority codes assigned to the authorized mobile networks, and a validity timer for the authorization information.

2. The proximity service server of claim 1 wherein:
the proximity service function is configured to determine network conditions for the authorized mobile networks, and to prioritize the authorized mobile networks for the UE based on the network conditions.

3. The proximity service server of claim 1 wherein:
the proximity service function is configured to determine UE conditions for the UE, and to prioritize the authorized mobile networks for the UE based on the UE conditions.

4. The proximity service server of claim 1 wherein:
the proximity service function, before the validity timer for the authorization information expires, is configured to monitor at least one of network conditions for the authorized mobile networks and UE conditions for the UE, to process the priority criteria and the at least one of the network conditions and the UE conditions to determine whether to trigger an update to the authorization information, to re-prioritize the authorized mobile networks for the UE based on the priority criteria and the at least one of the network conditions and the UE conditions responsive to a determination to trigger the update, and to transmit a notification to the UE through the interface component with updated authorization information that includes updated priority codes assigned to the authorized mobile networks.

5. The proximity service server of claim 1 wherein:
the proximity service function is configured to query a Home Subscriber Server (HSS) for a subscriber profile associated with the UE through the interface component, and to identify the authorized mobile networks that are authorized for the UE from the subscriber profile; and
the proximity service function is configured to update the subscriber profile in the HSS with the priority codes assigned to the authorized mobile networks.

6. A method comprising:
receiving, in a proximity service server, an authorization request from User Equipment (UE) for a proximity service;
identifying, at the proximity service server, a plurality of authorized mobile networks that are authorized for the UE for the proximity service;
prioritizing, at the proximity service server, the authorized mobile networks for the UE based on priority criteria to assign priority codes to the authorized mobile networks;
formatting, at the proximity service server, an authorization response for the proximity service with authorization information for the UE that indicates the priority codes assigned to the authorized mobile networks; and
transmitting the authorization response from the proximity service server to the UE;
wherein the authorization information includes a list of the authorized mobile networks, the priority codes assigned to the authorized mobile networks, and a validity timer for the authorization information.

7. The method of claim 6 further comprising:
determining network conditions for the authorized mobile networks; and
prioritizing the authorized mobile networks for the UE based on the network conditions.

8. The method of claim 6 further comprising:
determining UE conditions for the UE; and
prioritizing the authorized mobile networks for the UE based on the UE conditions.

9. The method of claim 6 wherein:
before the validity timer for the authorization information expires, the method further comprises:
monitoring at least one of network conditions for the authorized mobile networks and UE conditions for the UE;
processing the priority criteria and the at least one of the network conditions and the UE conditions to determine whether to trigger an update to the authorization information;
re-prioritizing the authorized mobile networks for the UE based on the priority criteria and the at least one of the network conditions and the UE conditions responsive to a determination to trigger the update; and
transmitting a notification to the UE with updated authorization information that includes updated priority codes assigned to the authorized mobile networks.

10. The method of claim 6 further comprising:
querying, at the proximity service server, a Home Subscriber Server (HSS) for a subscriber profile associated with the UE;
identifying the authorized mobile networks that are authorized for the UE from the subscriber profile; and
updating the subscriber profile in the HSS with the priority codes assigned to the authorized mobile networks.

11. User Equipment (UE) of an end user comprising:
a radio interface component configured to exchange over-the-air signals; and
a processor that implements an application for a proximity service, and that implements an authorization module for the proximity service;
the authorization module is configured to format an authorization request for the proximity service, to transmit the authorization request to a proximity service server through the radio interface component, and to receive an authorization response from the proximity service server through the radio interface component with authorization information for the proximity service,
wherein the authorization information includes a list of authorized mobile networks that are authorized for the UE for the proximity service, priority codes assigned to the authorized mobile networks, and a validity timer for the authorization information;
the authorization module is configured to select one of the authorized mobile networks for the proximity service based on the priority codes assigned to the authorized mobile networks;
the application is configured to access the one of the authorized mobile networks for the proximity service through the radio interface component.

12. The UE of claim 11 wherein:
the authorization module is configured to insert information on UE conditions in the authorization request.

13. The UE of claim 11 wherein:
the authorization module is configured to select the one of the authorized mobile networks that is assigned the highest priority code among the authorized mobile networks.

14. The UE of claim 11 wherein:
the authorization module, before the validity timer for the authorization information expires, is configured to monitor at least one of UE conditions for the UE and network conditions for the authorized mobile networks, to process priority criteria and the at least one of the UE conditions and the network conditions to determine whether to trigger an update to the authorization information, to transmit an update request to the proximity service server through the radio interface component responsive to a determination to trigger the update, and to receive an update response from the proximity service server through the radio interface component with updated authorization information;
the updated authorization information includes updated priority codes assigned to the authorized mobile networks.

15. A method comprising:
formatting, at User Equipment (UE) of an end user, an authorization request for a proximity service;
transmitting the authorization request from the UE to a proximity service server;
receiving an authorization response in the UE from the proximity service server with authorization information for the proximity service, wherein the authorization information includes a list of authorized mobile networks that are authorized for the UE for the proximity service, priority codes assigned to the authorized mobile networks, and a validity timer for the authorization information;
selecting, at the UE, one of the authorized mobile networks for the proximity service based on the priority codes assigned to the authorized mobile networks; and
accessing, at the UE, the one of the authorized mobile networks for the proximity service.

16. The method of claim 15 further comprising:
inserting information on UE conditions in the authorization request.

17. The method of claim 15 wherein selecting one of the authorized mobile networks comprises:
selecting the one of the authorized mobile networks that is assigned the highest priority code among the authorized mobile networks.

18. The method of claim 15 wherein:
before the validity timer for the authorization information expires, the method further comprises:
monitoring at least one of UE conditions for the UE and network conditions for the authorized mobile networks;
processing priority criteria and the at least one of the UE conditions and the network conditions to determine whether to trigger an update to the authorization information;
transmitting an update request to the proximity service server responsive to a determination to trigger the update; and
receiving an update response from the proximity service server with updated authorization information;
wherein the updated authorization information includes updated priority codes assigned to the authorized mobile networks.

* * * * *